United States Patent [19]

Justice

[11] Patent Number: 5,056,655
[45] Date of Patent: Oct. 15, 1991

[54] HIGHWALL MINER WITH CONVEYOR MODULE

[75] Inventor: James C. Justice, Beckley, W. Va.
[73] Assignee: Coaltex, Inc., Beckley, W. Va.
[21] Appl. No.: 592,968
[22] Filed: Oct. 4, 1990
[51] Int. Cl.⁵ .............................................. B65G 21/14
[52] U.S. Cl. .................................... 198/812; 198/303; 299/56
[58] Field of Search ............ 198/303, 314, 812, 861.2; 299/18, 56

[56] References Cited

U.S. PATENT DOCUMENTS

| | | | |
|---|---|---|---|
| Re. 31,622 | 7/1984 | Todd | 299/1 |
| 3,295,698 | 1/1967 | Ross | 214/2 |
| 3,863,752 | 2/1975 | Sibley | 198/303 |
| 4,120,535 | 10/1978 | Delli-Gatti, Jr. | 299/18 |
| 4,256,213 | 3/1981 | Shaw et al. | 198/303 |
| 4,474,287 | 10/1984 | Thompson | 198/812 |
| 4,969,691 | 11/1990 | Moore et al. | 198/812 X |

FOREIGN PATENT DOCUMENTS

| | | | |
|---|---|---|---|
| 3621274 | 1/1988 | Fed. Rep. of Germany | 198/812 |
| 0695003 | 7/1953 | United Kingdom | 198/812 |
| 800864 | 7/1956 | United Kingdom | |

*Primary Examiner*—Robert P. Olszewski
*Assistant Examiner*—James R. Bidwell
*Attorney, Agent, or Firm*—Nixon & Vanderhye

[57] ABSTRACT

Conveyor belt supporting modules associated with an endless conveyor belt assembly for conveying mined material from a mine bore to the mouth of the bore allows for necessary length of conveyor belt to be fed into the mine, and convey material from the mine, as the bore lengthens so that the conveyor belt always extends from adjacent the cutting site to the bore mouth. Each module has a carriage frame with a number of conveyor belt supporting return rollers extending between the frame sides, and a number of conveyor belt supporting trough roller sets mounted above the return rollers and spaced from each other from the front to the rear along the frame. The carriages have axles and wheels to allow movement into a bore, and they are connected together by couplers. The supporting trough roller sets are mounted for pivotal movement on a frame side to expose the return rollers so that the endless belt can be laid in place simply and quickly. An assembly, including a supporting structure, mounts a belt take-up unit and a number of modules are stacked one above the other on the right and left sides of the take-up unit, and are moved, in sequence, into operative association with the take-up unit to be fed into the bore mouth. The supporting trough roller sets on the left side of the take-up unit pivot about the left sides of the frames thereof, while those on the right side pivot about the right sides of the frames.

20 Claims, 5 Drawing Sheets

HIGHWALL MINER WITH CONVEYOR MODULE

BACKGROUND AND SUMMARY OF THE INVENTION

In the continuous mining of coal, or like material from a bore, it has been found very advantageous to convey the mined material from the cutting site to the bore mouth utilizing an endless belt conveyor. Such an apparatus is shown in U.S. Pat. No. 4,120,535, the disclosure of which is hereby incorporated by reference herein. In the mining machine illustrated therein, it is possible to add supporting sections for the endless conveyor belt as the bore lengthens so that the conveyor belt always extends from adjacent the cutting site to the bore mouth, without interruption of the mined material conveying operation of the conveying belts. However this is accomplished by mounting the return and trough rollers for supporting the conveyance and return portions of the conveyor belt so that they may be readily detached from the module frame. When each conveyance module is put into place at the bore mouth, it is put into place without the rollers attached to the frame, and then the rollers are fixed into place. This is too labor intensive and time consuming to maximize the conveyance action.

According to the present invention, a conveyance module is provided which overcomes the prior art problems discussed above. According to the present invention, the conveyance module comprises: A carriage frame having a front, rear, top, and sides. Mobile means mounting the carriage frame for movement into a bore, front first. A plurality of conveyor belts supporting return rollers extending between the frame sides below the top, and spaced from each other from front to rear along the frame. A plurality of conveyor belt supporting trough roller sets mounted at the top of the frame, above the return rollers, the sets spaced from each other front to rear along the frame. And, means for mounting the sets for pivotal movement about a horizontal axis at one side of the frame, the axis parallel to a center line from the front to the rear of the frame, so that each set may be pivoted up to expose the return rollers and allow the return portion of an endless conveyor belt to contact the return rollers. The mobile means preferably comprises a plurality of axles and wheels mounted on the frame, and coupling elements are provided at the front and rear of the frame for coupling each module to leading and trailing modules.

In order to efficiently insert the modules in the conveyance train for conveying mined material from the cutting site to the bore mouth, according to the invention it is desirable to provide a conveyor belt mounting assembly. The conveyor belt mounting assembly comprises: A supporting structure. A take-up assembly for an endless conveyor belt mounted on the supporting structure, the conveyor belt extractable from the take-up unit including a main belt portion and a return belt portion. Means for supporting a plurality of mobile carriages in the support structure so that the carriages may be moved, one at a time, into operative association with the endless conveyor belt, each mobile carriage having main rollers for receiving the main belt portion, and return rollers for receiving the return belt portion; and the supporting means supporting the carriages one above the other on opposite sides of the take-up means. All of the modules on the left hand side of the take-up unit have the trough supporting roller set thereof mounted for pivotal movement about the left side of the frame, while the conveyance units mounted on the right side of the take-up unit have the supporting roller conveyance sets mounted for pivotal action on the right hand side of the frame.

The entire supporting structure can be mounted on crawlers so that it can be moved from place to place (that is from bore mouth to bore mouth).

It is the primary object of the present invention to provide for the effective conveyance of mined material from a cutting site to a bore mouth utilizing a plurality of endless conveyor belt supporting modules. This and other objects of the invention will become clear from an inspection of the detailed description of the invention, and from the appended claims.

DETAILED DESCRIPTION OF THE DRAWINGS

Figure 1:
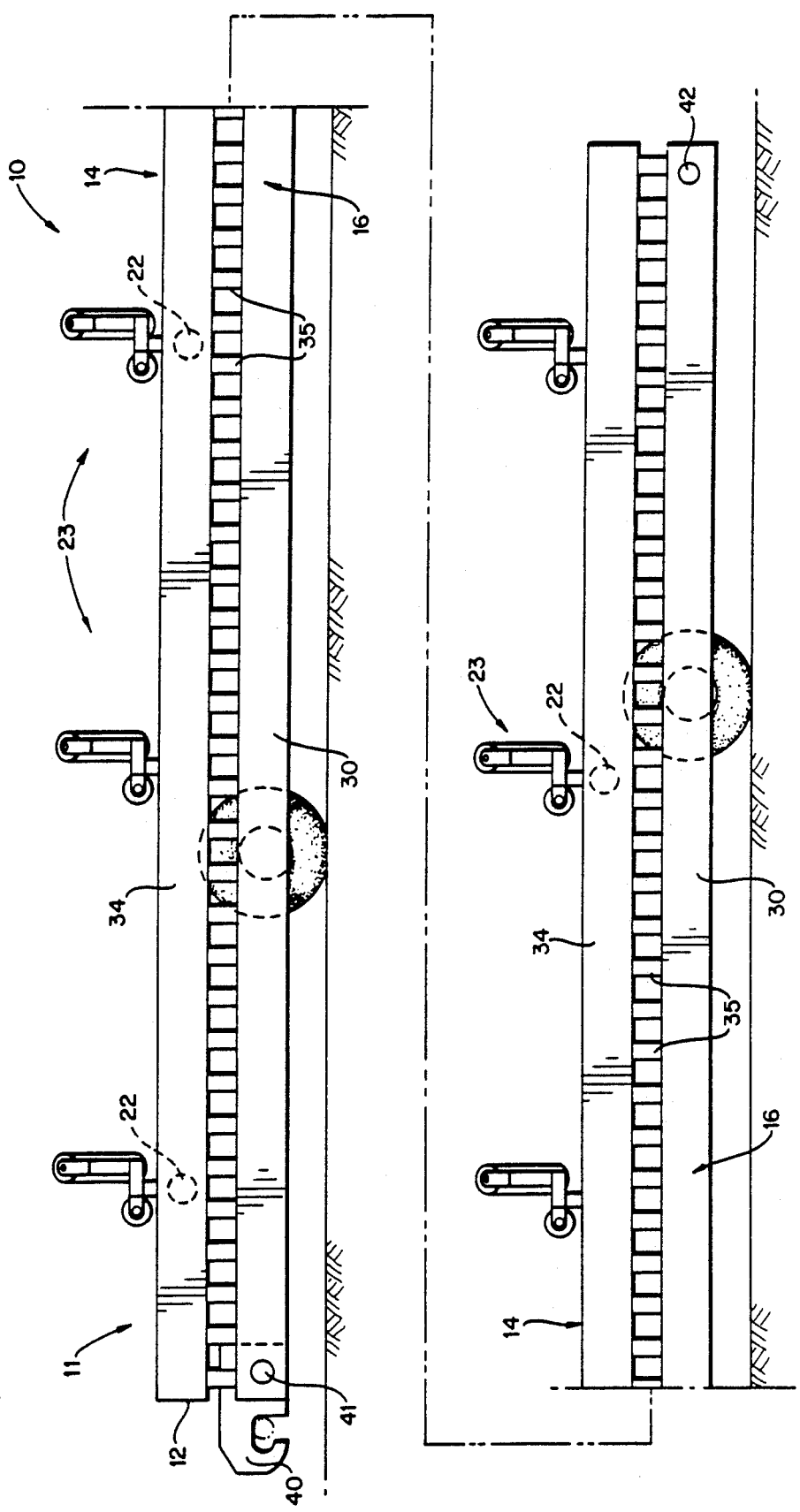
FIG. 1 is a side view of an exemplary conveyance module according to the present invention.
Figure 3:
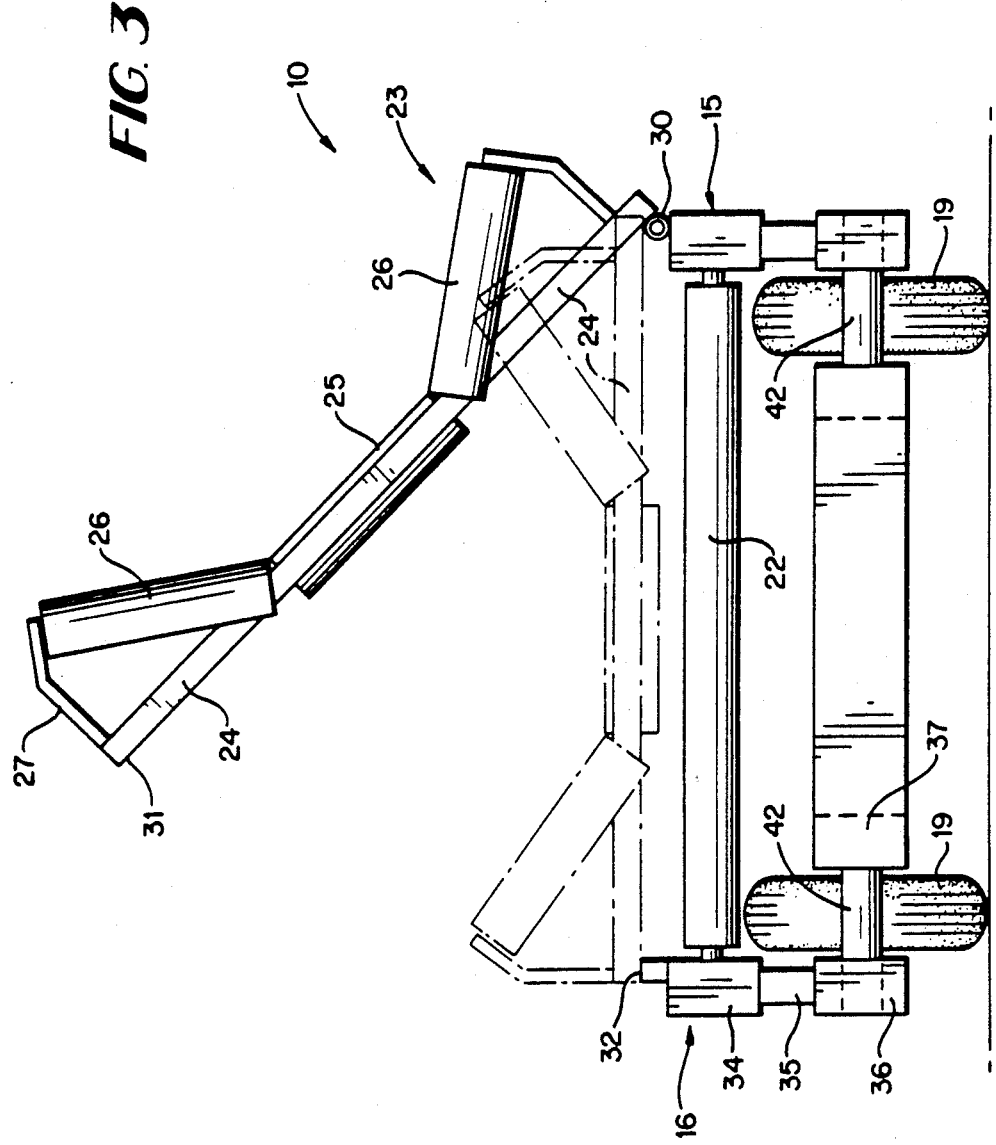
FIG. 3 is an end view of the module of FIGS. 1 and 2 showing the normal transporting position of the trough rollers in dotted line, and pivoted position thereof in solid line.

An exemplary conveyance module, for use in association with an endless conveyor belt is illustrated in FIGS. 1 and 3 of the drawings. The conveyance module—shown generally by reference numeral 10—is preferably used in the transportation of mined material from a cutting site in a mine, such as with the apparatus and in the method as shown in U.S. Pat. No. 4,120,535, the disclosure of which is hereby incorporated by reference herein.

The conveyance module 10 comprises a carriage frame 11 having a front 12, rear 13, top 14, right side 15, and left side 16. The frame elements are connected together by fasteners, welding, or the like. Mobile means are provided mounting the frame 11 for movement into a bore, front (12) first. While the mobile means may take a variety of forms, preferably the mobile means comprises a pair of axles 18 each supporting a pair of wheels 19, the axles extending in a dimension perpendicular to the center line 20 from the front 12 to the rear 13 of the frame 11.

The module 10 comprises a plurality of conveyor belt supporting return rollers 22 mounted for rotation about a horizontal axis perpendicular to the center line 20, and mounted below the top 14 of the module 10. The rollers 22 need not be easily disconnected from their mounting structures (e.g. are permanently mounted). The module 10 also comprises a plurality of conveyor belt supporting trough roller sets, shown generally by reference numeral 23 mounted at the top 14 of the frame (preferably extending from the top 14 as seen in FIG. 1).

The return rollers 22 and the trough roller sets 23, are per se conventional. The trough roller sets 23 and the return rollers 22 are spaced from each other along the length of the frame 11 (from the front 12 toward the rear 13 thereof), with the return rollers 22 preferably mounted below the sets 23 (as seen in FIG. 1), and with the necessity of only half the number of return rollers 22 as trough roller sets 23.

While the trough roller sets 23 may take a wide variety of forms, the particular—conventional per se—form illustrated in the drawings comprises a support bar 24 extending across the frame, with a main, bottom roller 25 mounted in front of the bar 24 for supporting the bottom of a conveyor belt laying thereon, while other portions of the conveyor belt engage the two angled rollers 26, the rollers 26 mounted for rotation about an axis between 1 and 89° with respect to the axis of the roller 25 (e.g. about 15° as illustrated in FIG. 3). The rollers 26 are mounted at one end thereof to the bar 24, and at the other end thereof by a flange support 27. The rollers 25, 26 need not be readily replaceable (e.g. permanently mounted in place).

Figure 4:
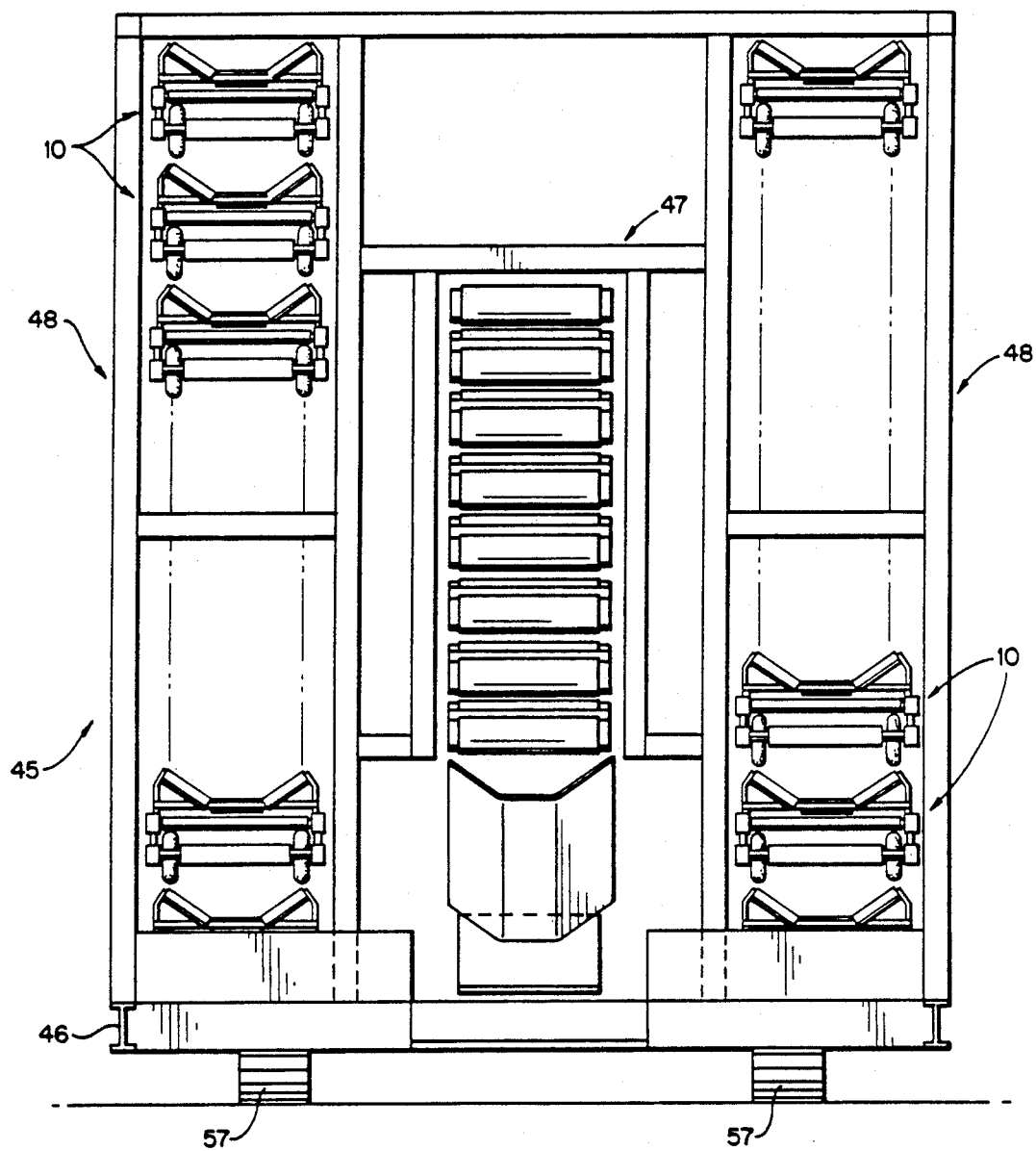
FIG. 4 is a front view of an assembly for facilitating the movement of conveyance modules, in sequence, into a bore, in operative association with an endless conveyor belt.
Figure 5:
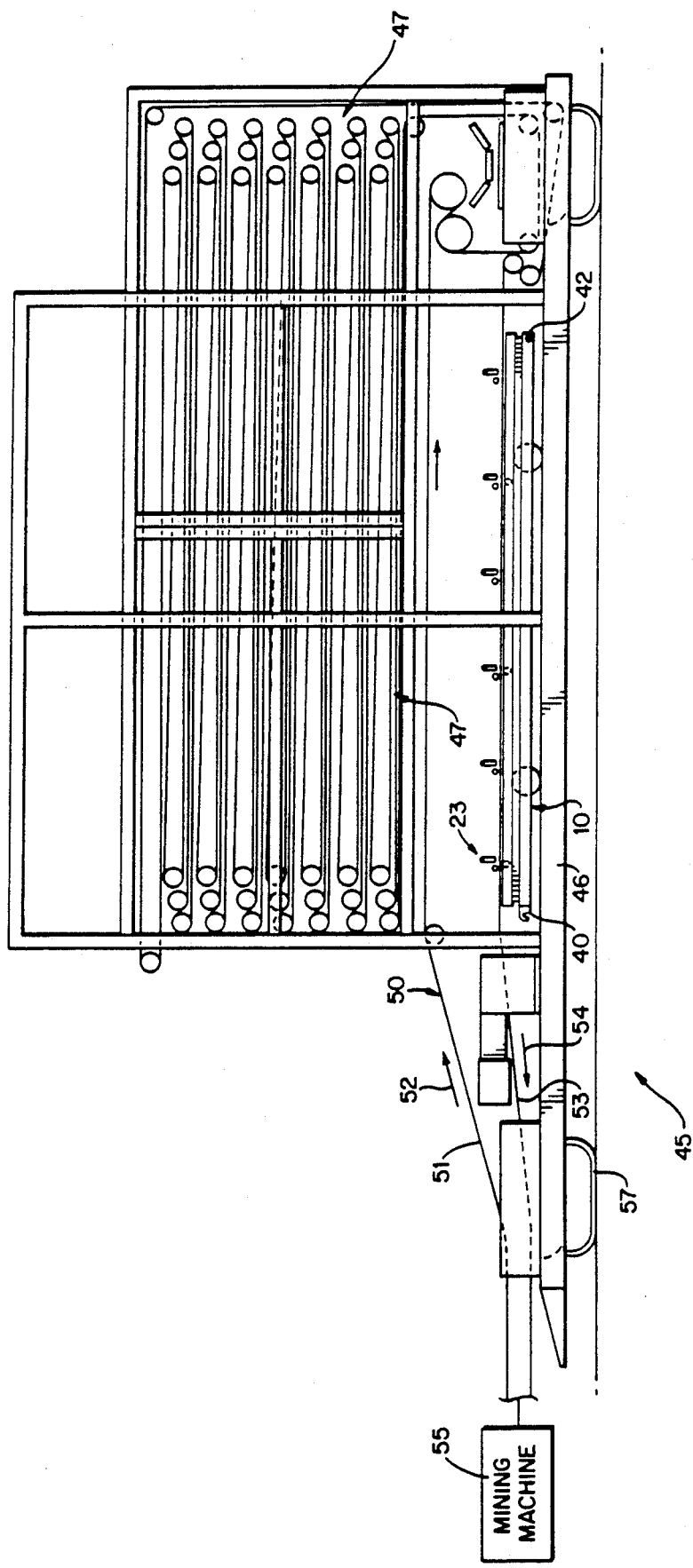
FIG. 5 is a side view of the assembly of FIG. 4 with the stacked modules removed for clarity of illustration of the other components.

According to the present invention, the module 10 may be readily moved into place with respect to an endless conveyor belt associated with a take-up unit, such as shown in said U.S. Pat. No. 4,120,535, or as shown in FIGS. 4 and 5 of this application. The feature of the invention that accomplishes this is the means for mounting each set 23 for pivotal movement about a horizontal axis at one side of the frame 11. For example with particular reference to FIG. 3, a pivot pin 30 is provided mounting the bar 24 to the right side 15 of the frame 11 so that it maybe swung from the dotted line position in FIG. 3 to the solid line position thereof. In the solid line position thereof, it exposes the return rollers 22 so that the return portion of an endless conveyor belt may readily contact the return rollers 22. After the return portion of the endless conveyor belt is put into place, the set 23 is pivoted back downwardly so that the bottom edge 31 of the bar 24 opposite the pivot pin 30 abuts the top side wall stop 32 on the left hand side 16 of the frame 11. While a latching means could be utilized to latch the set 23 in place in the downward position, normally the weight of the roller set 23 itself, combined with the weight of the conveyor belt and the mined material disposed thereon, will keep the roller set 23 in place without the necessity of a latch mechanism.

It is desirable to construct the particular side frame elements 15, 16 as illustrated in the drawings. That is, two side frame elements are provided on each of the sides 15, 16. For example with respect to the side 16 as illustrated in FIGS. 1 and 3, an uppermost or top side element 34 mounts the rollers 22 and roller sets 23, while extending below it—connected by transverse support bars 35—is a lower frame element 36 which mounts the axles 18, and the coupling means, as will be hereinafter described. Also—as illustrated most clearly in FIGS. 2 and 3—it is desirable to provide a second, inner, lower, frame element 37 to cooperate with the element 36 in mounting the axles and couplings.

Figure 2:
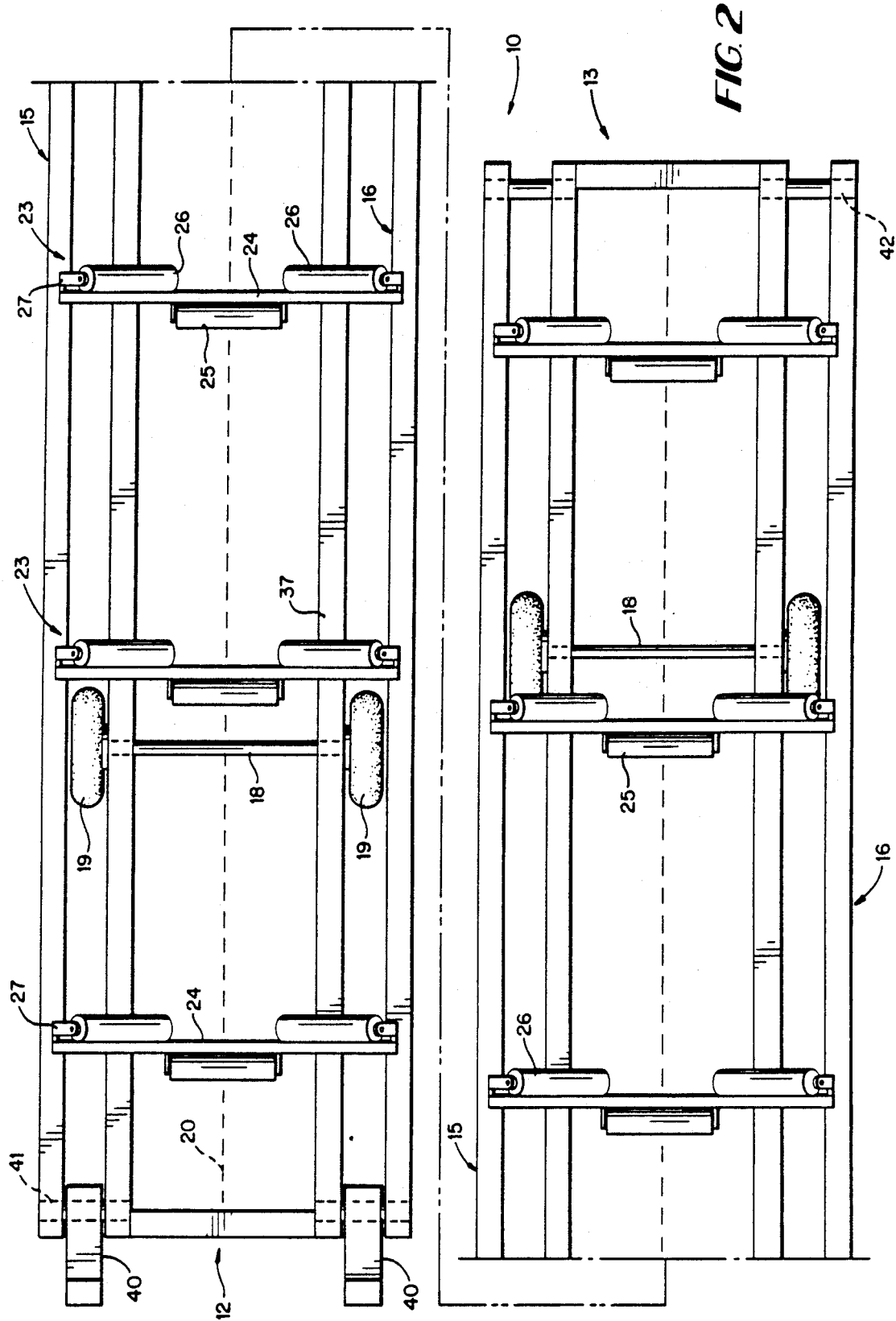
FIG. 2 is a top plan view of the module of FIG. 1.

The coupling means according to the present invention provide for ready connection and disconnection of the individual modules. At the front 12 of the frame 11 the coupling element 40 comprises a hooked shaped element, which is mounted for pivotal movement about a shaft 41, which is perpendicular to the center line 20. One such hook coupler 40 is mounted in association with each side 15, 16, as seen in FIG. 2. At the rear of each module 10, for cooperation with the hook elements 40 of the trailing module, bars 42 are provided, extending between the elements 36, 37.

An exemplary assembly for mounting the modules of FIGS. 1 through 3 and moving them into operative association with a mining machine is illustrated in FIG. 4. It is to be understood that the modules 10 may be utilized with the feeding apparatus of U.S. Pat. No. 4,120,535, or other suitable feeding apparatus too; however the assembly of FIGS. 4 and 5 is particularly advantageous.

The assembly of FIGS. 4 and 5—shown generally by reference numeral 45—comprises a supporting structure, for example bottom beams 46, a take-up unit supporting superstructure 47, and module supporting structures 48. The take-up unit 47 is per se conventional and automatically lets out and takes up an endless conveyor belt 50 (see FIG. 5), which has a main, conveyance portion 51 moving in the direction of arrow 52, and a bottom, return, portion 53 moving in the direction of arrow 54.

As illustrated most clearly in FIG. 5, the entire structure 45 is ultimately associated with a mining machine 55, which may comprise any conventional mining heads or the like, such as shown in U.S. Pat. No. 4,120,535, with a series of conveyance modules 10 extending from the mine site all the way to the bore mouth, where the structure 45 is located. In order to facilitate movement of the structure 45 from bore mouth to bore mouth, crawlers (tractor means) 57 or the like preferably are provided mounted on the bottom beams 46.

FIG. 4 schematically illustrates one exemplary manner of providing modules 10 in operative association with the endless belt take-up unit 47. As seen in FIG. 4, one plurality of modules 10 is mounted in a stack on the right of the take-up unit 47, while another is mounted on the left. The modules 10 are slightly vertically spaced from each other in the stack, as illustrated in FIG. 4. An elevator, lift, or any other desirable conventional structure may be used to stack the modules 10 on the structure 45, and move the stack up and down.

For ease of operation, it is preferred that the modules 10 stacked on the right hand side of the take-up unit 47 are constructed so that the sets 23 thereof are pivoted (e.g. have pivot point or pin 30 thereof) on the right hand frame side 15, whereas the modules 10 located to the left of the take-up unit 47 have the pivot pin 30 thereof mounted on the left hand side frame 16.

Each module is moved from a bottom position under the stack of modules, sideways toward the take-up unit 47 and the endless belt 50 extending therefrom. As it is moved sideways—such as by an air caster, stationary axis rollers built into the floor of the unit 45, hydraulic ram, or like conventional components—the trough roller set 23 thereof is pivoted upwardly until it passes past the lower portion (the return portion) 53 of the belt 50. Once the lower portion 53 has moved into a position over the rollers 22, the sets 23 pivot back downwardly to the position illustrated in FIG. 5. The module 10 is then pushed in the direction of arrow 54 until the front coupling 40 thereof engages the rear coupling pins 42 of the next adjacent module, at the same time this movement causing a conveyance, top portion 51 of the belt 50 to move into operative association with the rollers of the set 23.

Thus it will be seen that the extension of the conveyance belt from the mine site to the bore mouth may be continuously effected, in a simple and easy manner, without interruption of the mining or conveyance operations. The pivoting action of the sets 23 is much simpler than the required disconnection of the rollers in U.S. Pat. No. 4,120,535; and the stacking of a plurality of left and right hand configuration modules 10 on either side of the take-up unit 47—as illustrated in FIG. 4—is also desirable.

Utilizing the structure 45, modules 10, and mining machine 55, it is possible to continuously mine material from a bore and transport it to a bore mouth by cutting material in the bore to lengthen the bore, scooping up the cut material and funnelling it onto the conveyor belt 50 supported by the trough roller sets 23, adding supporting modules 10 for the conveyor belt 50 at the bore mouth as the bore lengthens by moving the modules 10 into place with the return portion 53 and supporting portion 51 of the conveyor belt 50, and providing the necessary length of conveyor belt from the conveyor take-up unit 47 so that the conveyor belt always extends from adjacent the cutting site to the bore mouth, and transporting the mined material from the cutting site to the bore mouth with the conveyor belt 50. This operation is accomplished—including the adding of the supporting sections and providing more conveyor belt—without interruption of the conveyance of the mined material, or the cutting action, and in a simple and effective manner.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A conveyance module associated with a mining machine for conveying mining material from a bore out to a bore mouth, said module comprising:
   a carriage frame having a front, rear, top, and sides;
   mobile means mounting said carriage frame for movement into a bore, front first;
   a plurality of conveyor belt supporting return rollers extending between said frame sides below said top, and spaced from each other from front to rear along said frame;
   a plurality of conveyor belt supporting trough roller sets mounted at the top of said frame, above said return rollers, said sets spaced from each other front to rear along said frame; and
   means for mounting said sets for pivoted movement about a horizontal axis at one side of said frame, said axis parallel to a center line from the front to the rear of said frame, so that each said set may be pivoted up to expose said return rollers and allow the return portion of an endless conveyor belt to contact said return rollers.

2. A module as recited in claim 1 wherein each trough roller set comprises: a support bar extending from a first frame side to the other and connected by a pivot pin, defining said horizontal axis, to said first frame side; a horizontal axis main roller having the axis thereof perpendicular to said pivot pin axis; and a pair of side rollers rotatable about axes disposed at an angle between 1° and 89° with respect to said main roller, and supported by said support bar.

3. A module as recited in claim 2 wherein said mobile means comprise a plurality of axles and a plurality of wheels supported by each axle.

4. A module as recited in claim 3 further comprising coupling elements at said front and said rear of said frame for coupling said module to a plurality of other modules.

5. A module as recited in claim 4 wherein said coupling means includes a pair of hook elements mounted at the front of said module for rotation about an axis extending between said module frame sides, and coupling bars disposed at the rear of said module in alignment with said coupling hooks at the front thereof, said bars connectable to comparable hooks on a trailing module.

6. A module as recited in claim 5 wherein said frame sides each comprise a pair of vertically spaced elongated frame elements, a top element supporting said conveyor belt supporting return rollers and said conveyor belt supporting trough rollers, and a bottom element mounting said coupling means and said mobile means.

7. A module as recited in claim 1 further comprising coupling elements at said front and said rear of said frame for coupling said module to a plurality of other modules.

8. A module as recited in claim 7 wherein said coupling means includes a pair of hook elements mounted at the front of said module for rotation about an axis extending between said module frame sides, and coupling bars disposed at the rear of said module in alignment with said coupling hooks at the front thereof, said bars connectable to comparable hooks on a trailing module.

9. A module as recited in claim 1 wherein said frame sides each comprise a pair of vertically spaced elongated frame elements, a top element supporting said conveyor belt supporting return rollers and said conveyor belt supporting trough rollers, and a bottom element mounting said coupling means and said mobile means.

10. A combination of a plurality of mobile carriages, and an assembly facilitating the continuous conveyance of mined material from a bore to the bore mouth utilizing an endless conveyor belt, comprising:
    a supporting structure;
    a take-up assembly for an endless conveyor belt mounted on said supporting structure, said conveyor belt extractable from said take-up unit and including a main belt portion and a return belt portion;
    a plurality of mobile carriages, each mobile carriage having main rollers for receiving said main belt portion, and return rollers for receiving said return belt portion; and
    means for supporting a plurality of said mobile carriages in said support structure so that said carriages may be moved, one at a time, into operative association with said endless conveyor belt, said supporting means supporting said carriages one above the other on opposite sides of said take-up means.

11. A combination as recited in claim 10 wherein each of said mobile carriages comprises:
    a carriage frame having a front, rear, top, and sides;
    mobile means mounting said carriage frame for movement into a bore, front first;
    a plurality of return rollers for supporting a conveyor belt extending between said frame sides below said top, and spaced from each other from front to rear along said frame;
    a plurality of trough roller conveyor belts supporting sets mounted at the top of said frame, above said return rollers, said sets spaced from each other front to rear along said frame; and means for mounting said trough roller sets for pivoted movement about a horizontal axis at one side of said frame, said axis parallel to a center line from the front to the rear of said frame, so that each said set may be pivoted up to expose said return rollers and allow the return portion of an endless conveyor belt to contact said return rollers.

12. A combination as recited in claim 11 wherein a first plurality of modules has said pivot axis on the right side of said frame, and are mounted on the right side of said take-up unit, and wherein a second plurality of modules has said pivot axis thereof mounted on the left side of said frame of said module, and are disposed on the left side of said take-up unit.

13. An assembly as recited in claim 12 further comprising tractor means mounting said supporting structure so that said supporting structure is movable.

14. An assembly as recited in claim 13 wherein said trough roller conveyor belt supporting sets each comprise: a support bar extending from a first frame side to the other and connected by a pivot pin, defining said horizontal axis, to said first frame side; a horizontal axis main roller having the axis thereof perpendicular to said pivot pin axis; and a pair of side rollers rotatable about axes disposed at an angle between 1° and 89° with respect to said main roller, and supported by said support bar.

15. An assembly facilitating the continuous conveyance of mined material from a bore to the bore mouth utilizing an endless conveyor belt comprising:

a supporting structure;

a take-up assembly for an endless conveyor belt mounted on said supporting structure, said conveyor belt extractable from said take-up unit and including a main belt portion and a return belt portion;

means for supporting a plurality of mobile carriages in said support structure so that said carriages may be moved, one at a time, into operative association with said endless conveyor belt, each mobile carriage having main rollers for receiving said main belt portion, and return rollers for receiving said return belt portion;

each of said mobile carriages comprising:

a carriage from having a front, rear, top, and sides;
mobile means mounting said carriage frame for movement into a bore, front first;
a plurality of return rollers for supporting a conveyor belt extending between said frame sides below said top, and spaced from each other from front to rear along said frame;
a plurality of trough roller conveyor belt supporting sets mounted at the top of said frame, above said return rollers, said sets spaced from each other front to rear along said frame; and
means for mounting said trough roller sets for pivoted movement about a horizontal axis at one side of said frame, said axis parallel to a center line from the front to the rear of said frame, so that each said set may be pivoted up to expose said return rollers and allow the return portion of an endless conveyor belt to contact said return rollers.

16. An assembly as recited in claim 15 wherein each of said conveyor belt supporting trough roller sets comprises: a support bar extending from a first frame side to the other and connected by a pivot pin, defining said horizontal axis, to said first frame side; a horizontal axis main roller having the axis thereof perpendicular to said pivot pin axis; and a pair of side rollers rotatable about axes disposed at an angle between 1° and 89° with respect to said main roller, and supported by said support bar.

17. An assembly as recited in claim 15 wherein each of said carriages mobile means comprises: a plurality of axles and a plurality of wheels supported by each axle.

18. An assembly as recited in claim 15 wherein each of said carriages further comprises: coupling elements at said front and said rear of said frame for coupling said module to a plurality of other modules.

19. An assembly as recited in claim 18 wherein each of said carriages coupling means comprises: a pair of hook elements mounted at the front of said module for rotation about an axis extending between said module frame sides, and coupling bars disposed at the rear of said module in alignment with said coupling hooks at the front thereof, said bars connectable to comparable hooks on a trailing module.

20. An assembly as recited in claim 15 further comprising tractor means mounting said supporting structure so that said supporting structure is movable.

* * * * *